United States Patent [19]
Ehmer et al.

[11] Patent Number: 5,221,127
[45] Date of Patent: Jun. 22, 1993

[54] CIRCUIT CONFIGURATION FOR MONITORING AN ANTI-LOCK BRAKE SYSTEM

[75] Inventors: Norbert Ehmer, Bad Orb; Rolf Spaeth, Loehnberg-Obershausen; Thomas Striegel, Liederbach; Harald Kahl, Limburg; Thomas Proeger, Roedermark; Wolfgang Kling, Frankfurt am Main, all of Fed. Rep. of Germany

[73] Assignee: Alfred Teves GmbH, Frankfurt am Main, Fed. Rep. of Germany

[21] Appl. No.: 805,230

[22] Filed: Dec. 11, 1991

[30] Foreign Application Priority Data

Dec. 17, 1990 [DE] Fed. Rep. of Germany ....... 4040256

[51] Int. Cl.$^5$ ............. B60T 8/32; B06K 41/20
[52] U.S. Cl. ................. 303/92; 180/197; 303/106; 303/110
[58] Field of Search .......... 303/92, 100, 103, 105, 303/106, 107, 108, 109, 110, 113 R; 180/197

[56] References Cited

U.S. PATENT DOCUMENTS

| | | | |
|---|---|---|---|
| 3,610,703 | 10/1971 | Slavin | 303/106 |
| 3,680,923 | 8/1972 | Peterson et al. | 303/92 |
| 3,709,567 | 1/1973 | Van Ostrom et al. | 303/92 |
| 3,907,378 | 9/1975 | Leiber | 303/92 |
| 3,953,080 | 4/1976 | Bremer | 303/107 |
| 4,036,537 | 7/1977 | Fleagle | 303/106 |
| 4,059,312 | 11/1977 | Jonner | 303/92 |
| 4,656,588 | 4/1987 | Kubo | 303/95 |
| 4,702,337 | 10/1987 | Burckhardt et al. | 180/197 |
| 4,729,608 | 3/1988 | Fennel et al. | 303/106 |
| 4,852,951 | 8/1989 | Matsuda | 303/108 X |

FOREIGN PATENT DOCUMENTS

| | | |
|---|---|---|
| 2631569 | 1/1978 | Fed. Rep. of Germany ....... 303/92 |
| 2712693 | 12/1987 | Fed. Rep. of Germany . |
| 3102227 | 12/1987 | Fed. Rep. of Germany . |
| 8807465 | 10/1988 | PCT Int'l Appl. . |

Primary Examiner—Matthew C. Graham
Attorney, Agent, or Firm—Robert P. Seitter; J. Gordon Lewis

[57] ABSTRACT

A circuit configuration for an anti-lock brake system, which receives input from wheel sensors positioned on the driven wheels, comprises a monitoring circuit (7) which triggers a test cycle (duration $T_{Test}$) when the two wheels of a driven axle signal instability for more than a predefined time span (T) during a control cycle. By way of the test cycle, braking pressure is introduced into the wheel brake of the instantaneously slower wheel ($v_1$, $v_{min}$-wheel) of the driven axle and the reaction of the driven wheels to the braking pressure delivered is assessed.

30 Claims, 3 Drawing Sheets

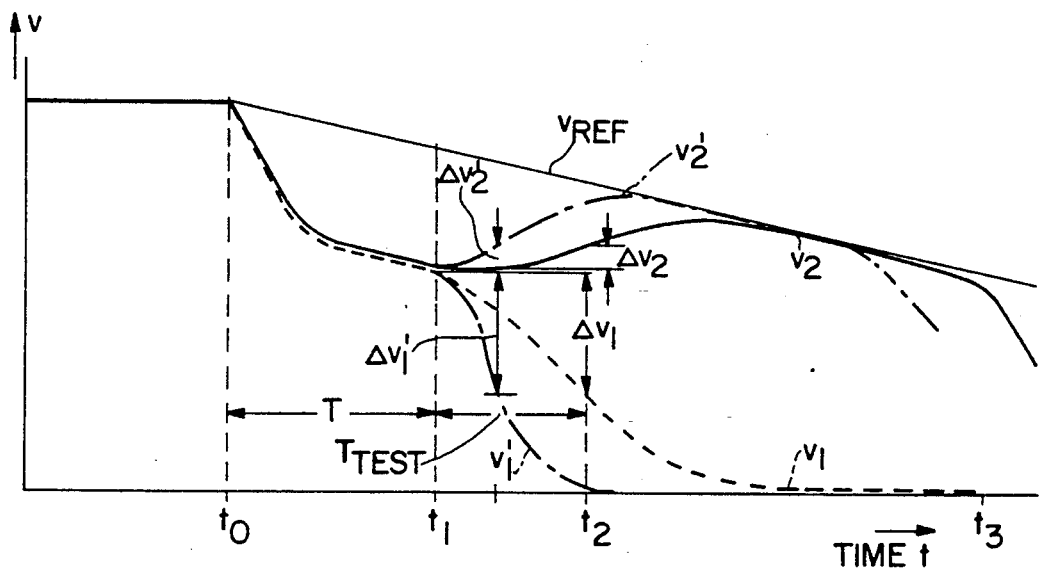
FIG.IA
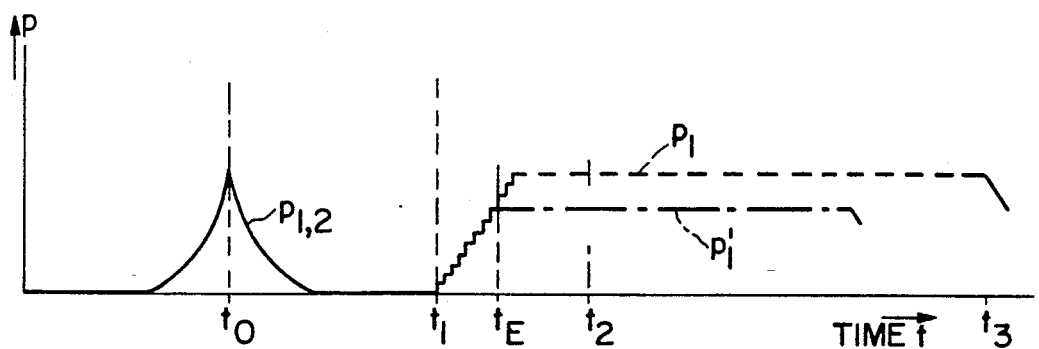
FIG.IB

CIRCUIT CONFIGURATION FOR MONITORING AN ANTI-LOCK BRAKE SYSTEM

BACKGROUND OF THE INVENTION

The present invention relates to a circuit configuration for an anti-lock brake system equipped with sensors for determining the rotational behavior of the driven wheels and comprising circuits for deriving from the sensor signals a vehicle reference speed which serves as a reference value for controlling the braking pressure in dependence on the rotational behavior of the individual wheels.

A great variety of anti-lock brake systems of this type are known. The information about the rotational behavior of the wheels and about the vehicle behavior required for the anti-lock control or braking pressure control is obtained by measuring the wheel rotational behavior using wheel sensors and by logically combining the sensor signals. Acceleration sensors, pressure sensors, and the like are also used in some cases. A vehicle reference speed, which serves as a reference value for judging the rotational behavior of the individual wheels and, hence, for controlling the braking pressure, is obtained by selecting and logically combining the wheel sensor signals, by interpolating or extrapolating the signals if no expressive information is available for a short time, and by limiting the speed gradient to the physically possible values or to other more expedient values of the vehicle deceleration and vehicle acceleration.

In order to reduce the manufacturing expenditure, great effort is made to use the smallest possible number of sensors, although the control quality depends on the assessable information. When only relatively few data are available for the control because few sensors are used, it is often difficult to correctly interpret the measured signals. One difficulty in assessing the wheel rotational behavior measured by the sensors results because the wheels are coupled with each other and with the drive motor. Due to its drag torque, the drive motor affects the wheel rotational behavior and, hence, can induce wrong information or misinterpretations.

It is an object of the present invention to diminish the influence which the engine drag torque has on the control in an anti-lock system equipped with only few sensors. This problem is especially significant if only the two driven wheels of a vehicle are furnished with wheel sensors or, in the case of all-wheel drive, where all wheels are interconnected by the drive shaft and, hence, act synchronously to a large extent.

SUMMARY OF THE INVENTION

To achieve that object, a circuit configuration of the type referred to above is equipped with a monitoring circuit. That circuit triggers a test cycle when the two wheels of a driven axle signal an instability during a control cycle for longer than a predetermined period of time. The test cycle assures that braking pressure is metered into the wheel brake of the instantaneously slower wheel of the driven axle, and the reaction of the driven wheels to the introduced braking pressure is assessed and analyzed, respectively.

Thus, when the duration of the pressure reduction on the two wheels of a driven axle is so long that the braking pressure must have been decreased almost completely, the present invention triggers a test cycle during the control. That action permits determination of whether an engine drag torque affects the control. When a low coefficient of friction prevails, the pressure introduced into the wheel brake of the slower wheel via the differential gear causes an increase in the speed of the second, faster wheel of the axle, thus improving the running stability and the lateral guidance of that wheel.

According to an embodiment of the present invention, the predetermined period of time which must be exceeded to trigger the test cycle is on the order of 300 to 800 msec, preferably 400 to 600 msec. The braking pressure is introduced during the test cycle preferably by a sequence of pressure-increasing pulses, and the reaction of the wheels to that pressure introduction is determined.

Further, a triggered test cycle is terminated immediately once the tendency of a driven wheel to spin is detected. Still further, the monitoring stops when the speed of the slower wheel is below a predetermined limit value of, e.g., 10 to 20 km/h.

In another embodiment of the present invention, an increase of the brake slip on the pressurized wheel during the test cycle and a simultaneous brake slip reduction on the second and, for vehicles with all-wheel drive, on the other driven wheels is assessed to indicate relatively great engine drag torque and a lower coefficient of friction. The preceding, relatively long pressure reduction would indicate a low coefficient of friction; this is confirmed by the differential effect, namely, by the speed increase of the unpressurized wheel.

A rise in the braking pressure on the pressurized wheel during the test cycle and the absence of a corresponding reaction, indicating a reduction of the brake slip on the other driven wheel(s), is assessed as an indication of an overly high vehicle reference speed. An overly high vehicle reference speed can occur, for example, due to malfunction, to incorrect adjustment of an additional sensor, or to other effects. The overly high vehicle reference speed will be corrected by approximating the reference value to the speed of the slowest ($v_{min}$) wheel.

Finally, when the brake slip on the pressurized wheel, on the other driven wheels, or both remains constant during a test cycle, this is assessed according to the present invention as an indication of a situation with a relatively high coefficient of friction or with an inhomogeneous coefficient of friction.

Additional embodiments are described below.

Further features, advantages, and possible applications of the present invention will be understood from the following detailed description in view of the attached drawings.

DESCRIPTION OF THE DRAWINGS

In the drawings:

FIGS. 1A, 1B, 2A, and 2B show a diagram of the wheel-speed variation and the braking-pressure variation in two different situations where a test cycle is triggered.

DETAILED DESCRIPTION OF PREFERRED EMBODIMENTS

Figure 2A:
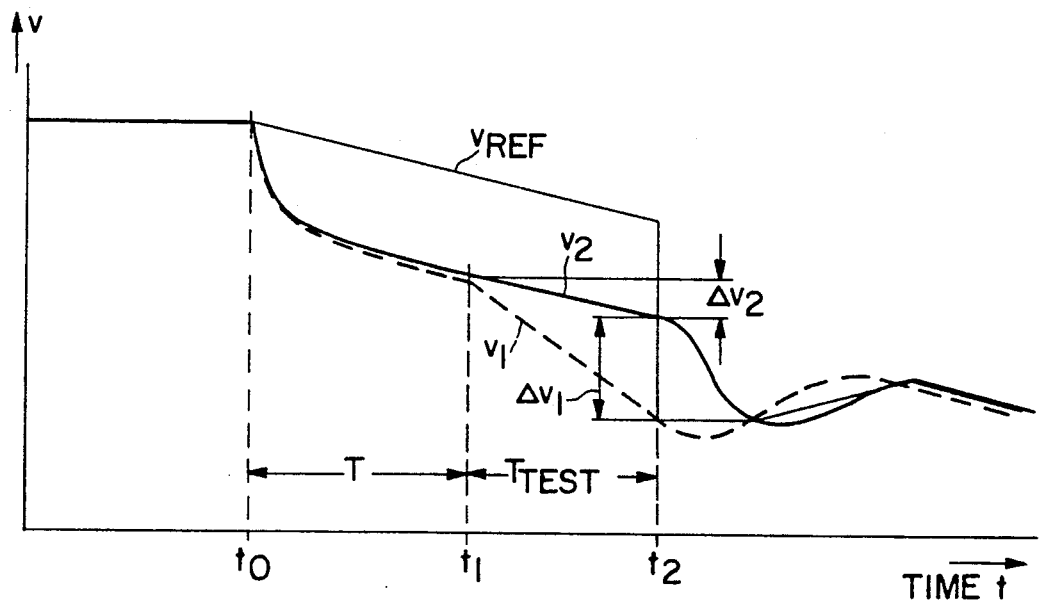
Figure 2B:
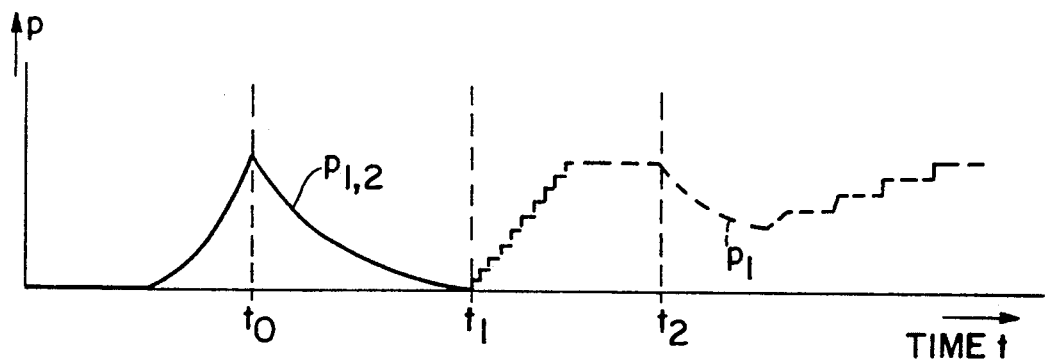
Figure 3:
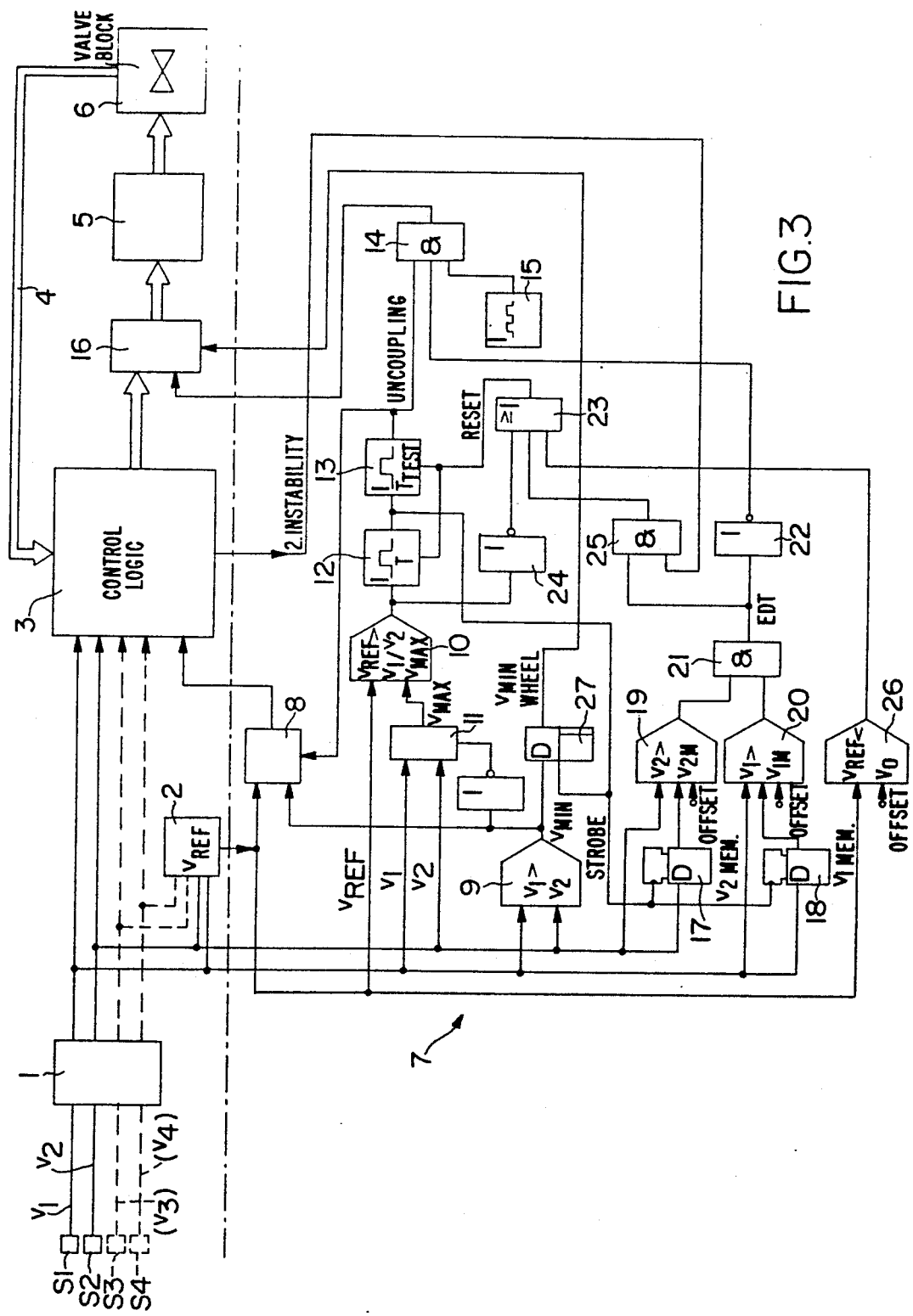
FIG. 3 shows in a block diagram the most important component parts of a circuit configuration according to the present invention.

The diagrams according to FIGS. 1A, 1B, 2A, and 2B and the circuit configuration according to FIG. 3 relate to a vehicle having only one driven axle and comprising only two wheel sensors, the output signals of which represent the rotational behavior of the two driven wheels. Additional sensors may be provided which respond once the vehicle exceeds specific deceleration thresholds. The control can be improved significantly by such vehicle sensors and, in particular, the vehicle reference speed can be incorporated more precisely. Nevertheless, such sensors are insignificant to the operation described below. The function of such additional sensors is similarly monitored by the circuit configuration.

FIG. 1A illustrates the speed (velocity) variation $v_1$, $v_2$ of the two driven wheels during a controlled braking operation for a relatively low coefficient of friction. The vehicle reference speed $v_{REF}$, derived in a known manner, is shown as well. After the anti-lock control begins, the reference speed at first follows the fastest vehicle wheel ($v_{max}$—wheel). The decrease of the vehicle reference speed is also limited to a predefined limit value of, for example, $-1.3$ g (where g is the constant of acceleration due to gravity). That limitation takes effect at time $t_0$ because the decelerations of both wheels will exceed the limit value at that time and, therefore, the wheels will become unstable. As the pressure variation marked on the same time axis in FIG. 1B shows, the braking pressure reduction starts at the point of time $t_0$. "$P_{1,2}$" designates the pressure variation in both wheels, which is identical at the beginning. Starting from $t_1$ the curve represents the pressure variation $p_1$ in the slower wheel, the speed of which is referred to as $v_1$. Hatching of the characteristic curves illustrates that the pressure variation $p_1$ is associated with the wheel exhibiting the speed $v_1$.

However, braking pressure reduction causes neither a recovery nor reacceleration of the driven wheels within the predetermined time span T. Therefore, a test cycle is triggered at time $t_1$ to detect the cause of the continuing instability and to intervene in a suitable manner in the course of the control. The test cycle, for which the time span $T_{Test}$ is intended, consists of introducing braking pressure by a test pulse train and observing the reaction to the braking pressure introduced. Braking pressure is introduced during the test cycle only into the wheel brakes of the instantaneously slower wheel, the $v_{min}$—wheel. In FIG. 1A, the speed of that wheel is designated $v_1$.

When a homogeneous, relatively low coefficient of friction exists between the wheel and the road, the introduced pressure increases the brake slip of the $v_{min}$—wheel and, consequently, further reduces the speed $v_1$. In contrast, the speed $v_2$ of the second wheel increases considerably due to the differential effect, the effect of the compensating lever between the two driven wheels, and approaches the vehicle reference speed $v_{REF}$. The wheel exhibiting the speed $v_2$ according to FIG. 1A gains stability and can now generate a lateral guide force. If the vehicle has a front-axle drive, the ability to steer the vehicle is improved by the described braking pressure introduction and the reduction of the slip on the unpressurized wheel. Slip rise on the pressurized wheel and slip reduction on the second wheel of the axle at time $t_2$, which marks the end of the test cycle, are referred to as $\Delta v_1$ and $\Delta v_2$ in FIG. 1A.

The speed curve in FIG. 1A and the reaction to the test cycle show that the excessively long slip phase and, consequently, the unstable rotation of the two wheels was due to the engine drag torque. The braking pressure introduced during the test cycle is kept constant after time $t_2$. The reaction to the test cycle illustrated in FIGS. 1A and 1B, prompted by the pressure introduction, is typical of a low coefficient of friction and a high engine drag torque "EDT". In the event of a high coefficient of friction, the introduction of the relatively low pressure would have hardly become apparent during the test cycle.

After "EDT" has been recognized, the braking pressure $P_1$ introduced into the slower wheel will be kept constant and thereby the faster wheel (speed $v_2$) will be stabilized through the differential effect until a second instability occurs on the faster wheel. That condition occurs at time $t_3$ as shown in FIGS. 1A and 1B.

FIG. 1A also depicts the wheel speed variation $v'_1$, $v'_2$ (dot-dash lines) in another situation. In this case the two driven wheels react considerably faster to the braking pressure introduction in comparison to the example described above. The braking pressure increase caused by the test pulses triggered during the test cycle stops immediately once "EDT" is detected. In FIG. 1B the pressure variation, $p_1$, is indicated by the dot-dash-lined branch of the braking pressure curve which becomes constant at time $t_E$. "EDT"-recognition applies once the slip variations $\Delta v_1$ and $\Delta v_2$ and, respectively, $\Delta v'_1$ and $\Delta v'_2$ reach predetermined values. In one embodiment, $\Delta v_1$, $\Delta v'_1$ were defined to be 10 km/h while $\Delta v_2$, $\Delta v'_2$ were defined to be 5 km/h.

FIGS. 1A and 1B refer to a situation where the reaction of the wheels to the test cycle shows that the cause of the long slip phase T—in contrast to the situation in FIG. 1A and 1B—cannot be due to a high engine drag torque. Although the introduction of braking pressure into the wheel brake of the wheel that is slower at time $t_1$ (the speed of the $v_{min}$—wheel is again referred to as $v_1$) similarly causes an increase of slip on the pressurized wheel, no differential effect occurs. The speed $v_2$ of the second driven wheel remains the same or decreases also, as is shown in FIG. 2A. The vehicle reference speed $v_{REF}$ is overly high in this situation and may be caused, for instance, by overspinning of the wheels just before the braking operation. At time $t_2$, namely, upon termination of the test cycle, the reference speed $v_{REF}$ will therefore be reduced to the speed $v_1$ of the slower wheel, the $v_{min}$—wheel. The braking pressure control will continue individually for each wheel.

The timely decrease of an overly high reference speed, which occurs at time $t_2$ in the $v_{REF}$ situation shown in FIG. 2A, is an important safety measure because an overly high vehicle reference speed imitates a great amount of brake slip to which the control would react in reducing the braking pressure.

The absence of the described differential effect on introduction of the braking pressure during the test cycle might also be due, of course, to a system error. If the decrease of the reference speed to the speed of the $v_{min}$-wheel does not have any effect, the anti-lock control will be deactivated to safeguard the brake function, even though without control.

In the embodiment of the invention on which the present description is based, a test cycle is triggered only if a predetermined minimum speed is exceeded. The test cycle only begins for that embodiment if the speed of the slower wheel exceeds 10 km/h.

It has proven expedient to predefine a monitoring time span T of 400 to 500 msec. In case both driven wheels remain in the slip condition during that time span T, the test cycle will be triggered whose duration $T_{Test}$ can range, for example, between 150 and 300 msec.

The reaction of the driven wheels during or at the end of the test cycle permits conclusions to be drawn on the existing situation and on appropriate measures of control. Thus, the control manages without those data which a sensor on a non-driven wheel would be able to supply.

FIG. 3 shows the most important component parts of an embodiment of a circuit configuration according to the present invention. The circuit blocks illustrated above the dot-dash line are required in general, while the module units shown beneath that line are necessary for performing the test cycles, for detecting an engine drag torque, and for correspondingly adapting the control. Thus, the units shown below the dot-dash line form the monitoring circuit 7.

The circuit configuration according to FIG. 3 is intended for an anti-lock brake system with only two wheel sensors S1, S2, on the one hand, or for an all-wheel brake system with four wheel sensors S1 to S4. The signal paths meant only for the second case are shown in broken lines.

The circuit configuration comprises a signal-processing unit 1 which is supplied with the output signals of the wheel sensors S1, S2 or S1 to S4. A vehicle reference speed $v_{REF}$ is formed in a circuit block 2 from the processed speed signals—under certain circumstances with the aid of further sensor signals not shown herein. Braking pressure control signals are generated in a control logic 3 which receives the processed sensor signals, the $v_{REF}$-signal, and signals returned via a bundle line 4. A valve control 5 and a valve block 6, the latter containing the actual braking pressure control valves, are also indicated.

The monitoring circuit 7—the system with only two sensors S1, S2 will be described in the following—comprises a multiplex unit 8 which supplies either the reference speed $v_{REF}$ formed in the circuit block 2 or the lower wheel speed $v_{min}$ determined in a comparator 9 to the control logic 3.

An output signal is present in a comparator 10 once the reference speed $v_{REF}$ exceeds $v_{MAX}$, which means that it also exceeds both $v_1$ and $v_2$. $V_{MAX}$ is determined in a multiplex unit 11.

Once $v_{REF}$ exceeds $v_{MAX}$, a time element 12 will be started which represents the maximal slip phase and the predetermined monitoring time span T—see FIG. 1A and FIG. 2A. Another time element 13 is connected to the output of time element 12 because a test cycle $T_{Test}$ follows upon expiration of the monitoring time span T. Via an AND-gate 14 this test cycle triggers test pulses which are generated in a clock generator 15 and are supplied to a circuit 16. This circuit 16 is arranged in the signal path leading from the control logic 3 to the valve control 5 and, in the presence of an output signal at the AND-gate 14, introduces the pulse-shaped braking pressure at the beginning of the test cycle with the duration $T_{Test}$.

To detect the engine drag torque "EDT", the output signal of the time element 12 is supplied to comparators 19, 20 via two parallel memory units 17, 18 which store, respectively, the higher and the lower instantaneous wheel speeds $v_2$, $v_1$. These comparators compare the actual speed $v_2$ with the corresponding stored value $v_{2M}$ and, respectively, compare $v_1$ with $v_{1M}$. An output signal is produced if simultaneously a predetermined limit value is exceeded, the magnitude of which depends on the signal at the "offset" input. The output signal of an AND-gate 21, to which the output signals of the two comparators 19, 20 are supplied, indicates whether the engine drag torque "EDT" exists. As soon as the presence of "EDT" is detected, the AND-condition at the input of the AND-gate 14 will be eliminated by an inverter 22, and further pressure delivery during the test cycle stops.

The time elements 12 and 13 are reset by an OR-gate 23. When the output signal of the comparator 10 stops, an output signal supplied via an inverter 24 to the OR-gate 23, the reset will be triggered because the reference speed $v_{REF}$ is less than the higher wheel speed $v_{MAX}$. The OR-gate 23 is also driven by an AND-gate 25 which combines the presence of an "EDT" signal with an output signal from the control logic. This output signal appears when, at time $t_3$—see FIGS. 1A and 1B, the stabilized wheel, namely the $v_{MAX}$-wheel ($v_2$ in FIG. 1A), becomes unstable for the second time since $t_0$. The pressure in the pressurized wheel which, via the differential effect, ensured the stability of the $v_{MAX}$-wheel will be decreased again after $t_3$.

A third input to the OR-gate 23, through which the reset of the time elements 12, 13 also can be triggered, is connected to the output of a comparator 26. A signal is supplied once the reference speed $v_{REF}$ becomes smaller than a predetermined speed threshold or "offset"-threshold of, for example, 10 km/h.

The braking pressure is introduced during the test cycle into the wheel brake of the slower wheel, namely the $v_{min}$-wheel. For this reason, the circuit 16 is driven by the comparator 9 via a flipflop 27 which is reset as soon as the monitoring time span T ends. As flipflop 27 is reset, the speeds $v_2$ and $v_1$ stored in the memory units 17, 18, respectively, are reset as described above.

What is claimed:

1. A circuit configuration for controlling the braking pressure of the driven wheels of an automotive vehicle having an anti-lock brake system, said circuit configuration comprising:

sensing means for sensing the rotational behavior of the driven wheels of an automotive vehicle and for developing sensor signals representative of the rotational behavior of said driven wheels of said automotive vehicle;

signal processing means responsive to said sensor signals for developing a vehicle reference speed signal;

brake control means for introducing braking pressure to brakes associated with said driven wheels of said automotive vehicle; and monitoring circuit means responsive to:
 (a) said sensor signals and said vehicle reference speed signal for:
  (1) developing an indication of instability when the difference between said sensor signal of said at least one of said driven wheels and said vehicle reference speed signal exceeds a predetermined limit value for longer than a predetermined time span,
  (2) triggering a test cycle having a duration $T_{Test}$ when an indication of instability of at least one of said driven wheels for longer than a predetermined time span is developed,
  (3) precluding a test cycle when the speed of one of said driven wheels is below a predetermined speed, and
  (4) activating said brake control means to introduce braking pressure to at least one of said brakes during said test cycle, and (b) said brake control means for assessing the reaction of said driven wheels to the introduction of said braking pressure by said brake control means, and (c) said sensor signals and said vehicle reference speed signal for deactivating said brake control means after termination of an indication of instability of said at least one of said driven wheels.

2. A circuit configuration as claimed in claim 1 wherein said predetermined time span is between approximately 300 and 800 msec.

3. A circuit configuration as claimed in claim 2 wherein said predetermined time span is between approximately 400 and 600 msec.

4. A circuit configuration as claimed in claim 1 wherein said brake control means for introducing said braking pressure into said wheel brakes during said test cycle adds pressure in a sequence of pressure increasing pulses.

5. A circuit configuration as clammed in claim 1 wherein said duration $T_{Test}$ of said test cycle is between approximately 50 and 500 msec.

6. A circuit configuration as claimed in claim 5 wherein said duration $T_{Test}$ of said test cycle is between approximately 150 and 300 msec.

7. A circuit configuration as claimed in claim 1 wherein said monitoring circuit means terminates said test cycle when a tendency of one of said driven wheels to spin is detected.

8. A circuit configuration as claimed in claim 1 wherein said monitoring circuit means evaluates a constant brake slip on one of said driven wheels during said test cycle to indicate an inhomogeneous coefficient of friction.

9. A circuit configuration as claimed in claim 1 wherein said predetermined speed is between approximately 10 and 20 km/h.

10. A circuit configuration as claimed in claim 1 wherein said introduced braking pressure increases said braking pressure by only one of said driven wheels during said test cycle and said monitoring circuit means evaluates an increase in brake slip of the wheel whose braking pressure is increased during said test cycle and a simultaneous reduction in brake slip on the other of said driven wheels to indicate a large engine drag torque and a simultaneously low coefficient of friction.

11. A circuit configuration as claimed in claim 10 wherein said driven wheels include a slower driven wheel and a faster driven wheel and said brake control means for introducing braking pressure stops when a predefined brake slip variation has occurred on each of said driven wheels and said braking pressure remains constant thereafter until the faster of said driven wheels next becomes unstable.

12. A circuit configuration as claimed in claim 1 wherein said introduced braking pressure increases said braking pressure of only one of said driven wheels during said test cycle and said monitoring circuit means evaluates an increase in the braking pressure on the wheel whose braking pressure is increased during said test cycle and a simultaneous absence of reaction in the other of said driven wheels to indicate an overly high vehicle reference speed.

13. A circuit configuration as claimed in claim 12 further comprising means for correcting said overly high vehicle reference speed by approximating said vehicle reference speed to the speed of one of said driven wheels.

14. A circuit configuration as claimed in claim 1 wherein said monitoring circuit means evaluates a constant brake slip on one of said driven wheels during said test cycle to indicate a high coefficient of friction.

15. A circuit configuration as claimed in claim 1 wherein said monitoring circuit means evaluates a constant brake slip on one of said driven wheels during said test cycle to indicate a system error.

16. A method for controlling the braking pressure in response to the rotational behavior of the individual wheels of an automotive vehicle having an anti-lock brake system equipped with sensors for determining sensor signals representative of the rotational behavior of the two driven wheels of a driven axle and circuits for deriving from the sensor signals a vehicle reference speed, said method comprising the steps of:

(a) providing a monitoring circuit;

(b) terminating the operation of said monitoring circuit when one of said two driven wheels of said driven axle is instantaneously slower than the other and the speed of the instantaneously slower of said two driven wheels of said driven axle is below a predetermined speed;

(c) developing an indication of instability when the difference between said sensor signal of at least one of said driven wheels and said vehicle reference speed signal exceeds a predefined limit value for longer than a predetermined time span;

(d) triggering a test cycle of duration $T_{Test}$ in response to an indication of instability;

(e) introducing braking pressure during said test cycle into the wheel brake of the instantaneously slower of said two driven wheels of said driven axle;

(f) assessing the reaction of said two driven wheels to the braking pressure introduced; and (g) analyzing the assessment of the reaction of said two driven wheels to said braking pressure introduced.

17. A method as claimed in claim 16 wherein said predetermined time span is between approximately 300 and 800 msec.

18. A method as claimed in claim 17 wherein said predetermined time span is between approximately 400 and 600 msec.

19. A method as claimed in claim 16 wherein said duration $T_{Test}$ of said test cycle is between approximately 50 and 500 msec.

20. A method as claimed in claim 19 wherein said duration $T_{Test}$ of said test cycle is between approximately 150 and 300 msec.

21. A method as claimed in claim 16 further comprising the step of terminating said test cycle when a tendency of one of said driven wheels to spin is detected.

22. A method as claimed in claim 16 wherein said braking pressure is introduced into said wheel brake during said test cycle by a sequence of pressure-increasing pulses.

23. A method as claimed in claim 16 wherein said predetermined speed is between approximately 10 and 20 km/h.

24. A method as claimed in claim 16 wherein the step of assessing includes evaluating an increase in brake slip of the wheel whose breaking pressure is increased during said test cycle and a simultaneous reduction in brake slip on the other driven wheel to indicate a large engine drag torque and a simultaneously low coefficient of friction.

25. A method as claimed in claim 24 wherein said introducing step stops when a predefined brake slip variation has occurred on each of said two driven wheels and said braking pressure remains constant thereafter until the faster of said two driven wheels of said driven axle next becomes unstable.

26. A method as claimed in claim 16 wherein the step of assessing includes evaluating an increase in the braking pressure on the wheel whose braking pressure is increased during said test cycle and a simultaneous absence of reaction in the other driven wheel to indicate an overly high vehicle reference speed.

27. A method as claimed in claim 26 further comprising the step of correcting said overly high vehicle reference speed by approximating said vehicle reference speed to the speed of the instantaneously slower of said two driven wheels.

28. A method as claimed in claim 16 wherein the step of assessing includes evaluating a constant brake slip on one of said two driven wheels during said test cycle to indicate a high coefficient of friction.

29. A method as claimed in claim 16 wherein the step of assessing includes evaluating a constant brake slip on one of said two driven wheels during said test cycle to indicate an inhomogeneous coefficient of friction.

30. A method as claimed in claim 16 wherein the step of assessing includes evaluating a constant brake slip on one of said two driven wheels during said test cycle to indicate a system error.

* * * * *